United States Patent [19]

Kawamura et al.

[11] Patent Number: 5,153,569
[45] Date of Patent: Oct. 6, 1992

[54] VISUAL IMAGE DISPLAY APPARATUS HAVING A VIDEO DISPLAY FOR ONE EYE AND A CONTROLLABLE SHUTTER FOR THE OTHER EYE

[75] Inventors: Akira Kawamura; Kazuo Togawa, both of Kanagawa, Japan

[73] Assignee: Sony Corporation, Tokyo, Japan

[21] Appl. No.: 690,559

[22] Filed: Apr. 24, 1991

[30] Foreign Application Priority Data

Apr. 24, 1990 [JP] Japan ................... 2-108079

[51] Int. Cl.$^5$ ............................................. G09G 3/02
[52] U.S. Cl. ................................... 340/705; 340/784; 359/630
[58] Field of Search .................. 340/705, 784 H; 358/236, 88, 91, 92; 359/376, 630, 631, 632, 633, 464, 466, 431, 691, 39, 62, 99

[56] References Cited

U.S. PATENT DOCUMENTS

| | | | |
|---|---|---|---|
| 3,923,370 | 12/1975 | Mostrom | 359/630 |
| 4,482,326 | 11/1984 | Witt | 340/716 |
| 4,636,866 | 1/1987 | Hattori | 340/705 |
| 4,705,371 | 11/1987 | Beard | 352/86 |
| 4,805,988 | 2/1989 | Dones | 358/88 |
| 4,808,978 | 2/1989 | Vernay | 340/705 |
| 4,859,030 | 8/1989 | Rotier | 359/633 |
| 4,933,755 | 6/1990 | Dahl et al. | 358/91 |
| 5,034,809 | 7/1991 | Katoh | 358/236 |

FOREIGN PATENT DOCUMENTS 1103961  4/1961  Fed. Rep. of Germany .

OTHER PUBLICATIONS

Proceedings of the Society for Information Display, vol. 28, No. 1 (1987), pp. 47-54.
Nature, vol. 261, May 20, 1976, pp. 253-255.

Primary Examiner—Alvin E. Oberley
Assistant Examiner—A. Au
Attorney, Agent, or Firm—Lewis H. Eslinger; Jay H. Maioli

[57] ABSTRACT

An optical apparatus using a display device is comprised of a lens system having an optical axis, a display device for displaying a video image on the optical axis, a beam splitter for splitting information of visual image, the beam splitter being formed so as to incline an angle of about 45 degrees relative to the optical axis and located under the lens system, and a shutter device disposed in front of the beam splitter for controlling transmission of image from the surrounding, wherein the video image is shown as a virtual image with the image from the surroundings when viewer peeps the video image from the back of the beam splitter.

16 Claims, 6 Drawing Sheets

Least Distance of Distinct Vision

VISUAL IMAGE DISPLAY APPARATUS HAVING A VIDEO DISPLAY FOR ONE EYE AND A CONTROLLABLE SHUTTER FOR THE OTHER EYE

BACKGROUND OF THE INVENTION

1. Field of the Invention

The present invention generally relates to optical apparatus and, more particularly, is directed to an optical apparatus for use with a virtual image display which magnifies and displays an image as a virtual image by a lens and so on.

2. Description of the Prior Art

In recent years, a stereoscopic (or three-dimensional effect) television using a lens and a liquid crystal panel or the like has been proposed (see Japanese Patent Laid-Open Gazette No. 59117889). A fundamental principle of such previously-proposed liquid crystal stereoscopic television will be described with reference to FIG. 1.

Referring to FIG. 1, there is shown a convex lens 6 which is composed of a plurality of lenses in actual practice, and a transmission-type liquid crystal display 7 is supported in front of the convex lens 6 by a supporting device 8 together with the convex lens 6 to thereby display a video image on a display screen 9 of the transmission-type liquid crystal display 7. The transmission-type liquid crystal display 7 is disposed within a focal length f of the convex lens 6. Also, an eye 5 is distant from the convex lens 6 by a distance of 1 to 3 cm in the opposite side of the transmission-type liquid crystal display 7.

With the above arrangement, the transmission-type liquid crystal display 7 is disposed within the focal length f of the convex lens 6 so that, when the viewer views a video image on the display screen 9 of the transmission-type liquid crystal display 7 from the eye 5 side through the convex lens 6 by natural light or guided light 10, the viewer can watch a virtual image 4 in the enlarged form at the position distant from the actual position in which the video image is displayed on the display screen 9.

FIG. 2 is a plan view of the optical system of FIG. 1. As shown in FIG. 2, left and right convex lenses 6L and 6R for magnification are respectively disposed between left and right eyes 5L, 5R and left and right transmission-type liquid crystal displays 7L, 7R, whereby video images displayed on the left and right transmission-type liquid crystal displays 7L, 7R are magnified and stereoscopic virtual images are displayed on left and right virtual image planes 4L, 4R, respectively.

In the conventional virtual image display device of lens magnification type shown in FIGS. 1 and 2, the left and right convex lenses 6L, 6R are located very close to the left and right eyes 5L, 5R. Thus, when the viewer wears the virtual image display of this arrangement, the viewer cannot see the view of the surroundings without taking off such virtual image display device, which is very dangerous.

Further, there is a conflict between inclinations (congestion angles) of the left and right eyes 5L, 5R and the focusing adjustment of crystalline lenses used in the display. More specifically, video images on the left and right virtual image planes 4L, 4R viewed by the left and right eyes 5L, 5R shown in FIG. 2 must coincide with each other. However, a distance $l_1$ between the human left and right eyes 5L and 5R is not always the same so that a length $l_2$ between the left and right convex lenses 6L and 6R must be moved or adjusted. If the length $l_2$ is changed, the positions of video images displayed on the left and right virtual image planes 4L, 4R will be displaced. FIG. 3 is a schematic diagram used to explain an example in which the video images displayed on the left and right virtual image planes 4L, 4R are displaced in position. In FIG. 3, the virtual image plane 4L is for the left eye and the virtual image plane 4R is for the right eye. A predetermined point $A_L$ on the virtual image plane 4L viewed by the left eye 5L and a predetermined point $A_R$ on the virtual image plane 4R viewed by the right eye 5R should be displayed at the same position.

When the viewer watches such an object by this virtual display, inclinations of left and right eyes become $\phi_1$ and $\phi_2$, which means that the viewer watches a hypothetical point A on a plane S1. On the other hand, the left and right eyes 5L, 5R are focused on the points $A_R$, $A_L$ on the virtual image planes 4R, 4L so that the focused states of crystalline lenses and the inclination angles of both eyes are not coincident, thereby viewer's eyes being fatigued.

OBJECTS AND SUMMARY OF THE INVENTION

Accordingly, it is an object of the present invention to provide an optical apparatus in which the aforenoted shortcomings and disadvantages encountered with the prior art can be substantially eliminated.

More specifically, it is an object of the present invention to provide an optical apparatus in which the viewer can watch the view of the surroundings in a moment without taking off the optical apparatus.

It is another object of the present invention to provide an optical apparatus in which the viewer can watch a virtual image as if the viewer were watching the virtual image with both eyes.

It is a further object of the present invention to provide an optical apparatus in which inclinations of both eyes and focusing adjustment of crystalline lens can be prevented from becoming inconsistent with each other.

It is yet a further object of the present invention to provide an optical apparatus which is applied to a up-heads display or the like.

According to an aspect of the present invention, an optical apparatus using a display device is comprised of a lens having an optical axis, a display device for displaying a video image on the optical axis, a beam splitter for splitting information of a visual image, the beam splitter being formed so as to incline an angle of about 45 degrees under the lens, a shutter device disposed in front of the beam splitter for controlling transmission of a image from the surroundings, wherein the video image is shown as a virtual image with the image from the surroundings when viewer views the video image from the back of the beam splitter.

The above, and other objects, features and advantages of the present invention will become apparent from the following detailed description of illustrative embodiments thereof to be read in conjunction with the accompanying drawings, in which like reference numerals are used to identify the same or similar parts in the several views.

DETAILED DESCRIPTION OF THE PREFERRED EMBODIMENTS

The present invention will hereinafter be described with reference to the drawings.

Figure 1:
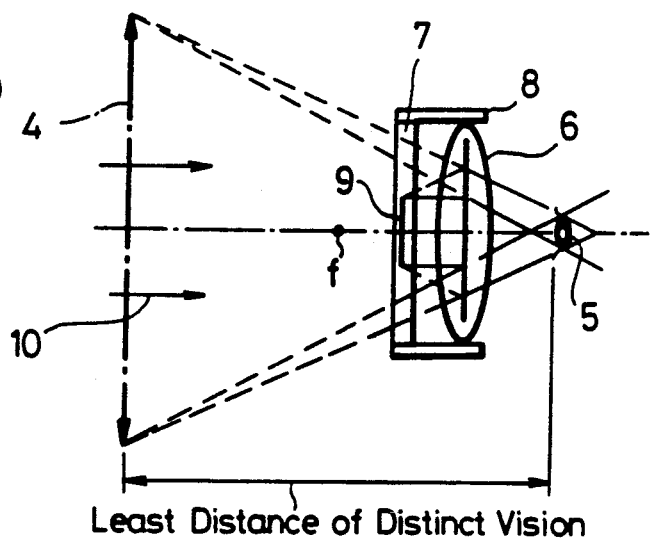
FIG. 1 is a schematic diagram used to explain a fundamental principle of a conventional liquid crystal stereoscopic viewing device.
Figure 2:
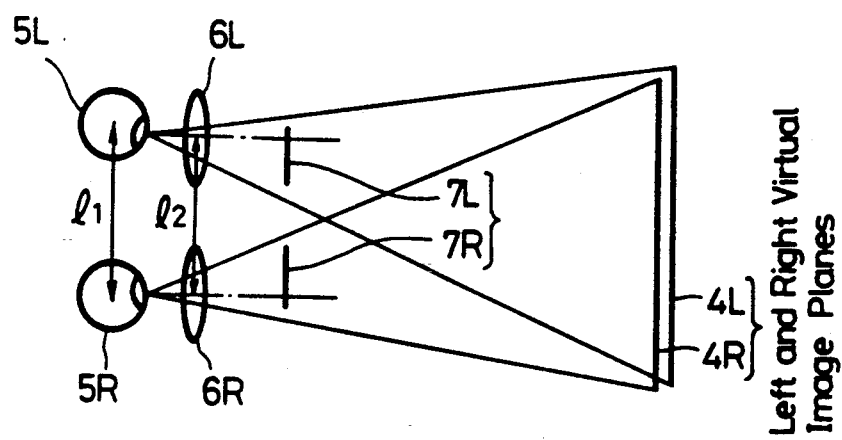
FIG. 2 is a plan view of the conventional liquid crystal stereoscopic viewing device.
Figure 3:
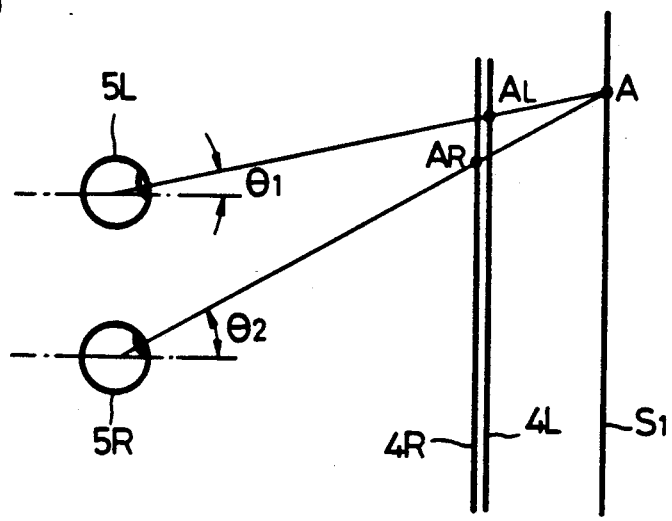
FIG. 3 is a schematic diagram used to explain a displacement of left and right virtual planes.
Figure 4:
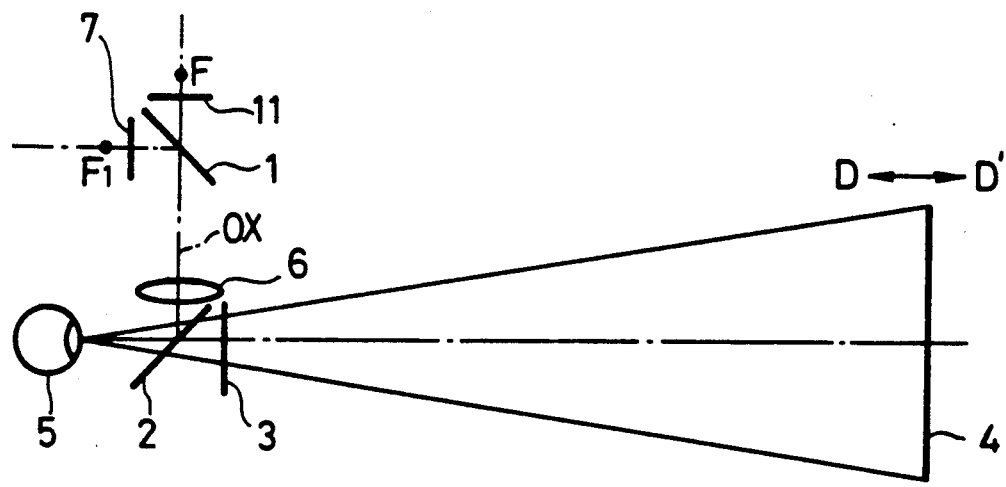
FIG. 4 is a schematic diagram showing a first embodiment of an optical apparatus according to the present invention, and to which references also will be made in explaining a principle of the present invention.

FIG. 4 is a schematic diagram of a fundamental arrangement of the optical apparatus according to the present invention. In this embodiment, the present invention is applied to the above-mentioned virtual image display apparatus which magnifies and displays an image as a virtual image by a lens system.

Referring to FIG. 4, a mirror 1 is located with an inclination angle of 45 degrees relative to an optical axis ox of a convex lens system 6, which is actually composed of one to several lenses but shown as a single convex lens for simplicity, to turn the optical axis ox at a right angle. A viewfinder display 7 is disposed between a focal point $F_1$ of the convex lens system 6 and the mirror 1 in the direction perpendicular to the optical axis ox which has been turned at a right angle as described above. Under the convex lens system 6, a beam splitter 2 is disposed with an inclination angle of 45 degrees relative to the optical axis ox of the convex lens 6. In this embodiment, a half mirror, a half prism and so on also will be referred to as the beam splitter. A liquid crystal shutter 3 is disposed in front of the beam splitter 2, and under the condition that the liquid crystal shutter 3 is closed, when the viewer sees the arrangement at the position of eye 5 in front of the liquid crystal shutter 3, an image displayed on the viewfinder display 7 can be observed as a virtual image 4. In this case, the viewfinder display 7 may be located at a hypothetical position 11 from an optics standpoint because it is reflected by the mirror 1 disposed on the optical axis ox of the convex lens system 6 and the focal point thereof also may be located on a hypothetical position F. Thus, when the viewfinder display 7 and the mirror 1 are moved, a relative position between the convex lens system 6 and the position 11 is changed so that a diopter can be adjusted by moving the position of the virtual image 4 as shown by arrows D—D' in FIG. 4. Further, when the viewer wants to see the surroundings quickly, the light emission from the viewfinder display 7 is stopped and the liquid crystal shutter 3 is placed in the opened state. Furthermore, when the viewer wants to see both the surroundings and the virtual image 4, the viewfinder display 7 is set in the light emission state and the liquid crystal shutter 3 is set in the opened state so that the viewer can easily see the surroundings by any one of the above-mentioned two operations.

Figure 5:
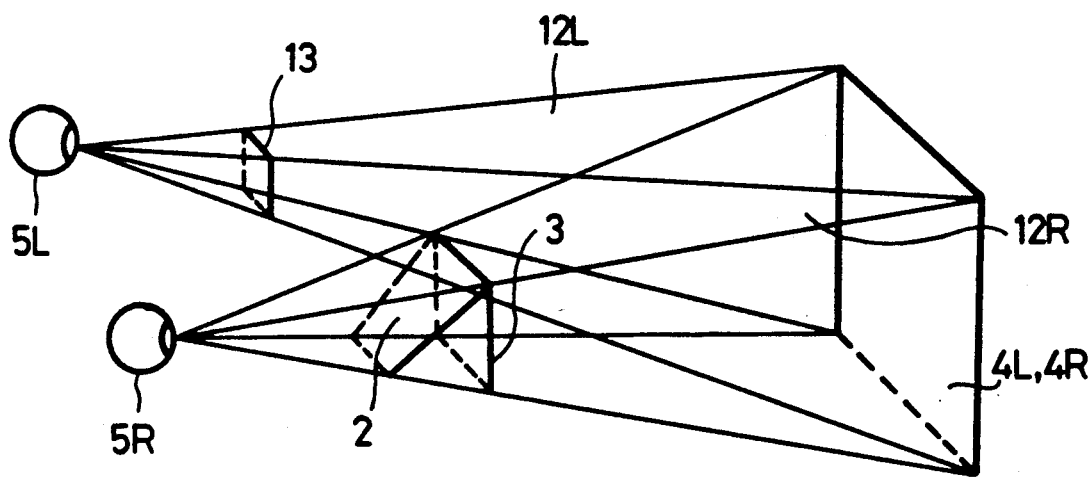
FIG. 5 is a schematic diagram showing a second embodiment of the optical apparatus according to the present invention, and to which references will be made in explaining another principle of the present invention.

FIG. 5 is a schematic diagram showing a second embodiment of the optical apparatus according to the present invention, and to which references will be made in explaining another fundamental principle of the optical system of this invention.

As shown in FIG. 5, in the optical paths from left and right eyes 5L, 5R to virtual image planes 4L, 4R, optical paths of view lines from the left and right eyes 5L, 5R to left and right virtual image planes 4L, 4R form quadrangular pyramids 12L, 12R, respectively. When the right eye 5R sees the virtual image on the right virtual image plane 4R by an arrangement similar to that of FIG. 4, a liquid crystal shutter 13 is provided along the cross section of the quadrangular pyramid 12L formed in front of the left virtual image plane 4L of the left eye 5L to take away visual information of virtual image which the left eye 5L should have seen on the left virtual image plane 4L. In that case, the liquid crystal shutter 13 inserted into the optical path of the quadrangular pyramid 12L is constructed as shown in FIGS. 6A and 6B.

Figure 6A:
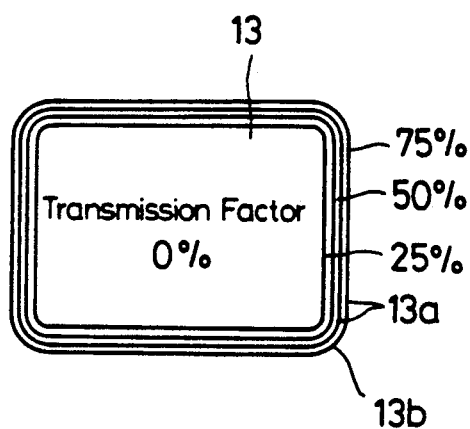
FIGS. 6A and 6B are schematic diagrams showing, respectively, an arrangement of a liquid crystal shutter of the present invention.
Figure 6B:
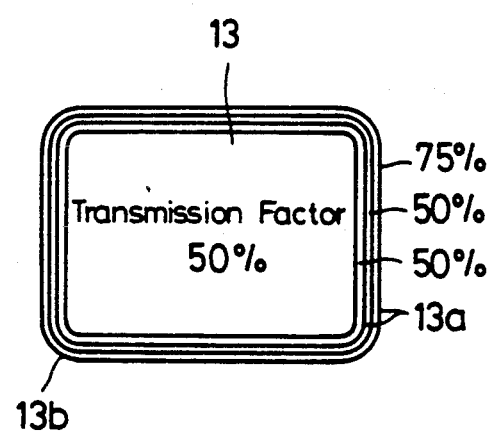

FIG. 6A shows a transmission factor when the liquid crystal shutter 13 is in its ON state and FIG. 6B shows a transmission factor when the liquid crystal shutter 13 is in its OFF state. Under the condition that the liquid crystal shutter 13 is in its ON state as shown in FIG. 6A, the transmission factor of external light at the center of the liquid crystal shutter 13 is 0%, the transmission factor at the inner peripheral portion of the liquid crystal shutter 13 is 25%, and the transmission factors at the outer peripheral portions of the liquid crystal shutter 13 are 50 and 75%, in other words, the transmission factor is increased in the peripheral portion of the liquid crystal shutter 13. In that case, however, the areas having transmission factors 50% and 75% are formed of a ND (neutral density) filter whose transmission factor has no wavelength dependency and the areas having transmission factors 0% and 25% are formed as the liquid crystal shutter. Further, four corners 13a of the liquid crystal shutter 13 and the ND filter 13b are round-cornered by relatively large diameters so that, when the liquid crystal shutter 13 is disposed near the eyes, the contour of the liquid crystal shutter 13 is blurred so that the viewer cannot feel the existence of the liquid crystal shutter 13. Incidentally, under the condition that the liquid crystal shutter 13 is in its OFF state as shown in FIG. 6B, the transmission factor of the liquid crystal shutter 13 is selected to be 50%.

Figure 7:
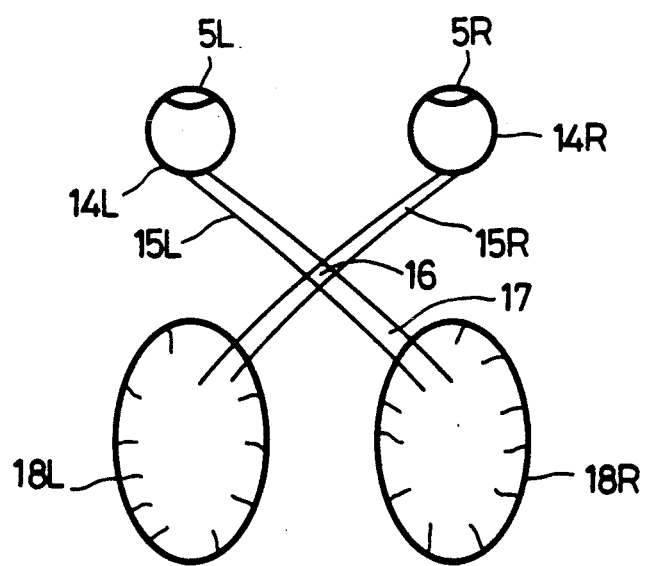
FIG. 7 is a schematic diagram used to explain an effect in which the viewer feels as if the viewer were watching a virtual image with both eyes although the viewer actually watches the virtual image with one eye.

If the thus arranged liquid crystal shutter 13 is disposed as shown in FIG. 5 and if this liquid crystal shutter 13 is placed in its ON state, the viewer sees the virtual image on the left virtual image plane 4L only with the right eye 5R as if the viewer saw it with both eyes. It is needless to say that the liquid crystal shutter 13 may be provided on the right eye 5R side and the virtual image magnifying optical system including the beam splitter 2 and the liquid crystal shutter 3 may be provided on the left eye 5L side. The reason for such illusion will be described with reference to FIG. 7. As shown in FIG. 7, stimulations on retinas 14L, 14R of left and right eyes 5L, 5R are sent through optic nerves 15L, 15R to optic chiasma portion 16 and supplied through optic tracts 17 to opposite cerebral right hemisphere 18R and cerebral left hemisphere 18L. As described above, the optical nerves cross each other at the optic chiasma portion 16 so that stimulations obtained by the left and right eyes 5L, 5R coincide with each other within the brain thus to obtain a 3-D effect or to see stereoscopic picture by both eyes.

According to the second embodiment of FIG. 5, since visual information of the virtual image display region (i.e., area of the quadrangular pyramid 12L in FIG. 5) in the eyeball in which no virtual image is displayed is dropped out, it may be considered that, in the human visual system, the dropped-out visual information of the left eye is compensated for by the visual information of the right eye, thereby obtaining the effect that the same virtual image is seen by both eyes.

That is, according to the arrangement of the second embodiment of the present invention, even when only one eye sees the virtual image, the same effect in which the two eyes see the virtual image can be achieved by utilizing the human visual processing system function. Therefore, unlike the conventional two-eye virtual system, inconsistency between the inclinations of both eyes and the focusing adjustment of the crystalline lenses can be avoided.

Figure 8:
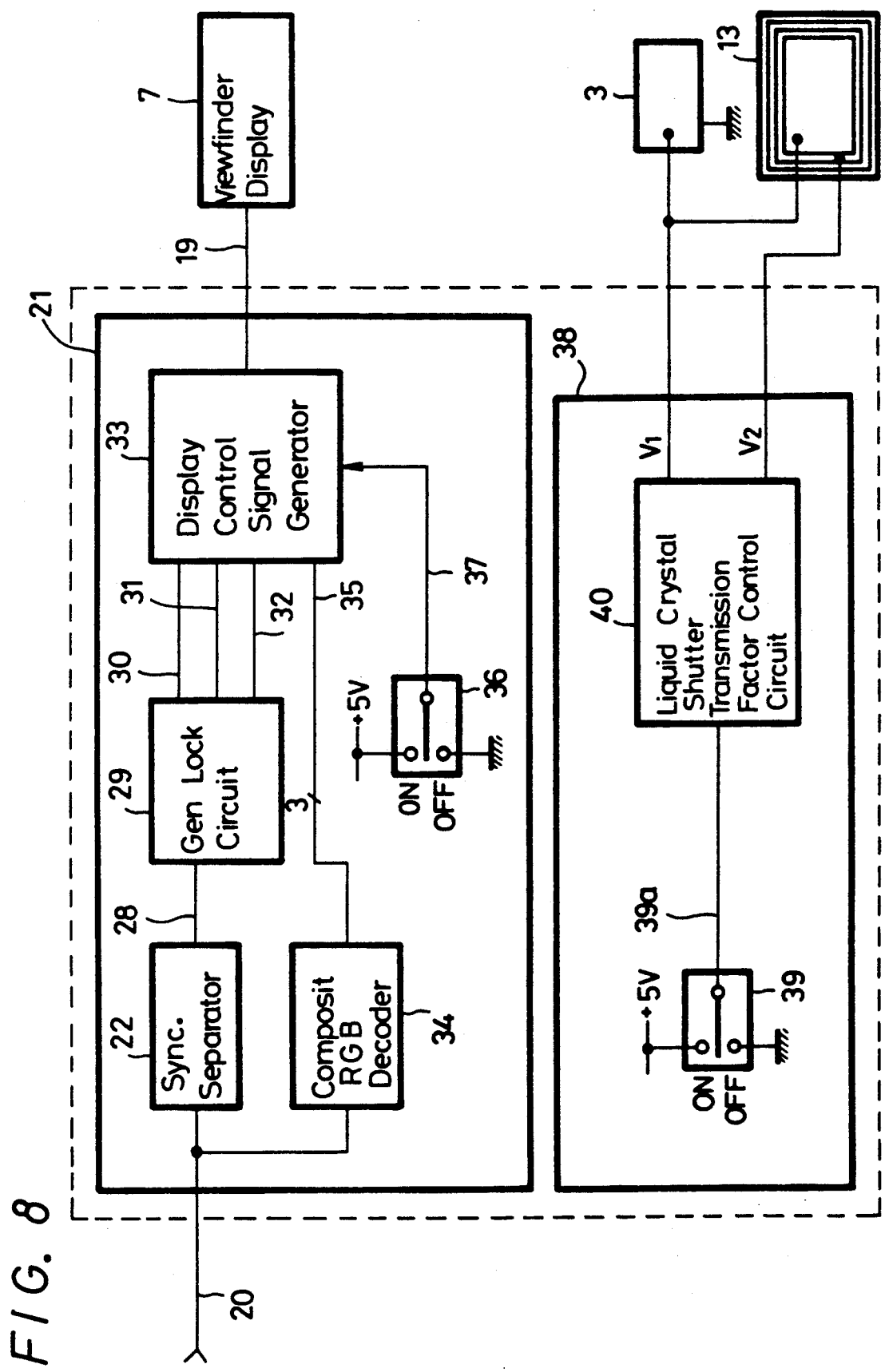
FIG. 8 is a systematic block diagram showing a control circuit for controlling a viewfinder display and liquid crystal shutters used in an embodiment of the present invention.

FIG. 8 shows in block form control circuits for controlling the viewfinder display 7 and the liquid crystal shutters 3 and 13.

Referring to FIG. 8, a control signal 19 for energizing the viewfinder display 7 is generated from a display control circuit 21, and the liquid crystal shutters 3 and 13 are controlled by voltage $V_1$ and/or $V_2$ from a liquid crystal shutter control circuit 38.

Initially, the display control circuit 21 will be described. As shown in FIG. 8, a composite video signal 20 is supplied to a composite - RGB decoder 34 which decodes the input composite video signal 20 into R (red), G (green) and B (blue) component video signals. The composite video signal 20 is also supplied to a sync. (synchronizing) separator 22 which separates a sync signal from the composite video signal 20. The sync. separator 22 separates a composite sync. signal (hereinafter referred to as a CSYNC) 28 from the composite video signal 20. The composite - RGB decoder 34 decodes the composite video signal 20 to provide a RGB video signal 35, which is supplied to a display control signal generating circuit 33. The composite sync. signal 28 from the sync. separator 22 is supplied to a gen lock circuit 29 which then generates horizontal and vertical synchronizing signals (HSYNC, VSYNC) 30, 31 and a clock signal 32, which are all supplied to the display control signal generating circuit 33. The display control signal generating circuit 33 generates the control signal 19 which controls the viewfinder display 7 from the above horizontal and vertical synchronizing signals 30 and 31, the clock signal 32, an on/off switching signal 37 provided by the operation of a manual switch 36 and the RGB video signal 35 from the composite - RGB decoder 34.

Figure 9:
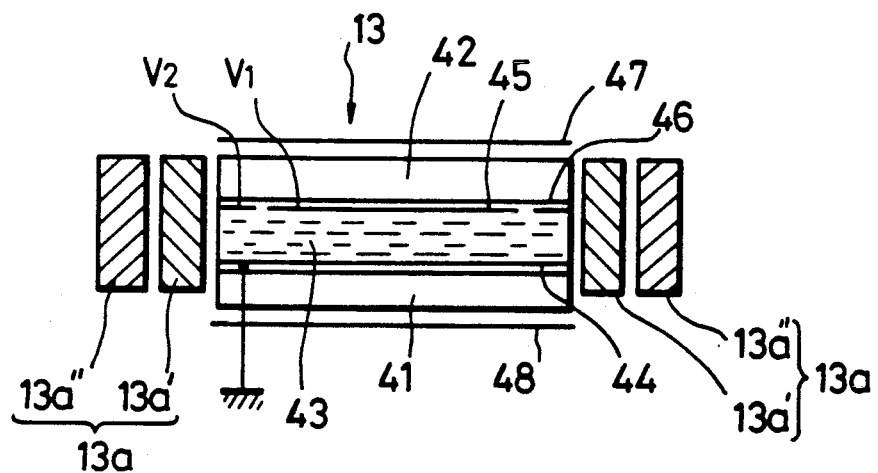
FIG. 9 is a cross-sectional side view of the liquid crystal shutter used in the present invention.

In the liquid crystal shutter control circuit 38, an on/off switching signal 39a generated from a manual switch 39 to turn the liquid crystal shutters 3 and 13 on and off is supplied to a liquid crystal shutter transmission factor control circuit 40 which then generates voltage $V_1$ or/and $V_2$ to control the liquid crystal shutter 3 or/and 13. The voltage $V_1$ is the AC voltage that is used to set the transmission factor of the liquid crystal shutter 3 or 13 to be 0% or 50%, while the voltage $V_2$ is the AC voltage that is used to set the transmission factor of the liquid crystal shutter 13 to be 25% or 50%. In this embodiment, the voltage $V_1$ is supplied to the liquid crystal shutter 3 and the voltages $V_1$ and $V_2$ are supplied to the liquid crystal shutter 13. FIG. 9 shows a cross-sectional side view of the above liquid crystal shutter 13.

As seen in FIG. 9, the liquid crystal shutter 13 has provided on its periphery the ND filter 13a shown in FIGS. 6A and 6B. The ND filter 13a is composed of an ND filter 13a'' having 75% transmission factor and an ND filter 13a' having 50% transmission factor. In the liquid crystal shutter 13, a liquid crystal 43 is sealed between front and rear glasses 41 and 42 and an electrode of one glass 41 is arranged as an entire transparent conductive layer 44 which is connected to the ground. An electrode of the other glass 42 is formed as a transparent conductive layer which is composed of a central portion electrode 45 and a peripheral portion electrode 46. The voltage $V_2$ is supplied to the peripheral portion electrode 46 and the voltage $V_1$ is supplied to the central portion electrode 45.

Figure 11:
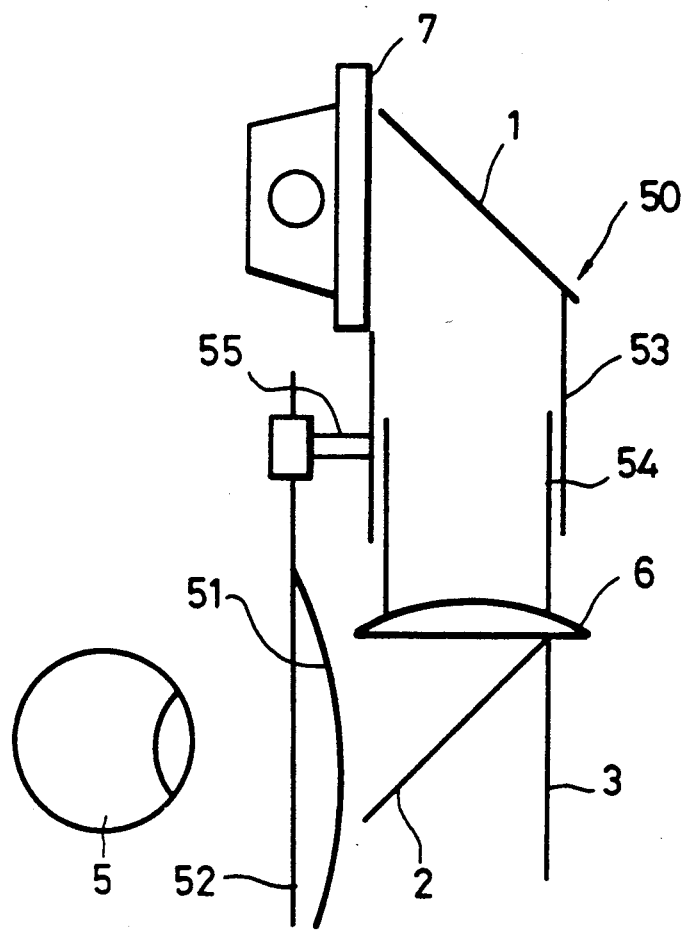
FIG. 11 is a cross-sectional side view taken along a line A—A in FIG. 10.
Figure 10:
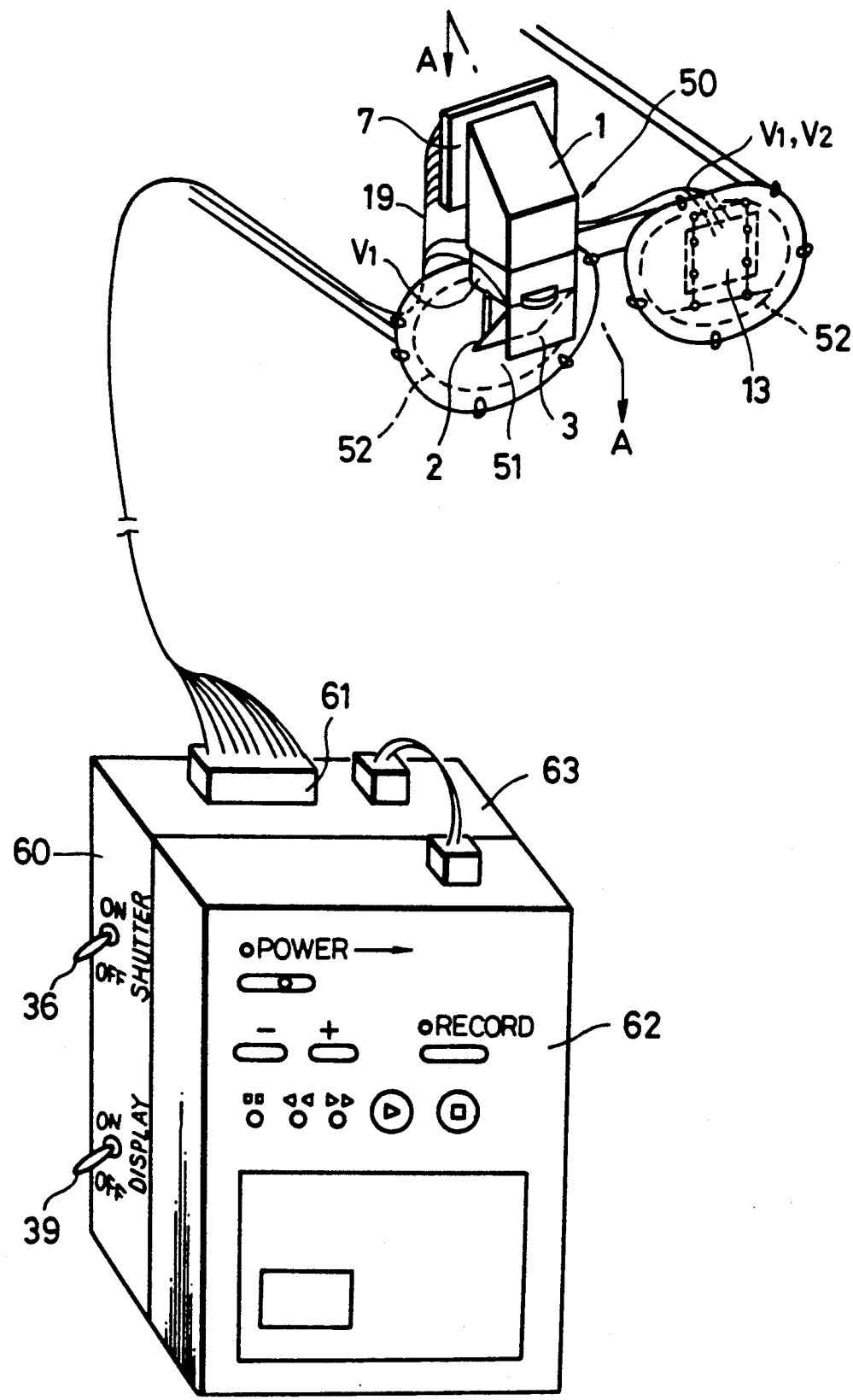
FIG. 10 is a perspective view of the optical apparatus of the present invention in which the optical apparatus is applied to glasses.

FIG. 10 is a perspective view showing the case where the optical apparatus of the present invention is attached to spectacles. FIG. 11 is a cross-sectional side view taken along the line A—A in FIG. 10 and illustrating schematically the optical system thereof. The entire arrangement will be described below with reference to FIGS. 10 and 11.

In FIGS. 10 and 11, reference numeral 50 generally designates a whole arrangement of the optical apparatus of this embodiment which is attached to the spectacles. As illustrated, the optical apparatus 50 is fastened to one lens of the spectacles 51 by fixing members 52. As shown in FIG. 11, the viewfinder display 7 and the mirror 1 are secured to a first housing 53 and the optical apparatus 50 is secured to one lens of the spectacles 51 by the fixing member 52 vertically elongated from an arm 55 which is extended outwards from the outside of the first housing 53. A second housing 54 is slidably engaged into the first housing 53, and the convex lens system 6, the beam splitter 2 and the liquid crystal shutter 3 are secured to the second housing 54. Thus, when the first and second housings 53 and 54 are slidably moved, a diopter adjustment is performed as described above so that the position of the virtual image is changed in the D—D' direction (see FIG. 4). As shown in FIG. 10, the liquid crystal shutter 13 is secured to the other lens (left hand glass) of the spectacles 51 by the fixing member 52 in parallel to the lens surface.

The display control circuit 21 and the liquid crystal shutter control circuit 38 shown in FIG. 8 are housed in a housing 60 as shown in FIG. 10. Also, the manual operation switches 36 and 39 (see FIG. 8) are mounted, for example, to the left side wall of the housing 60, and the control signal 19 and the AC voltage $V_1$ and/or $V_2$ are supplied through a connector 61 to the viewfinder display 7 and the liquid crystal shutters 3 and 13. The composite video signal 20 (see FIG. 8) is supplied to the housing 60-side from a small video tape recorder (VTR) 62 through a connector 63. The small VTR 62 and the housing 60, having the control circuit system incorporated therein, are unitarily formed as one body so that the viewer can carry the same on the shoulder or wear the same on his side by a belt or the like.

Incidentally, if a video camera is connected to the 8-mm VTR, the present invention will be utilized as an optical apparatus of a viewfinder of the camera. Furthermore, if an infrared camera is connected to the optical apparatus of the invention and if the liquid crystal shutter is made in the transparent state, the present invention can also be utilized as an optical apparatus of a so-called heads-up display (the head-up display displays information necessary for pilot or the like on the inner surface of a front glass as a virtual image superimposed upon the surroundings).

According to the optical apparatus of the present invention, when the viewer watches the virtual image under the condition that the liquid crystal shutter is closed, the optical apparatus can be switched so as to see only the surroundings in an instant or the viewer can see the virtual image and the surroundings at a time under the condition that the liquid crystal shutter is opened. Therefore, when the viewer wants to see the surroundings, the viewer need not take off the optical apparatus and can see the surroundings in a moment. Furthermore, although the virtual image is seen through only one eye, the viewer can see an virtual image as if he had seen it through both eyes. Thus, it is possible to obtain the optical apparatus in which inconsistency between the inclinations of both eyes and the focusing adjustment of crystalline lenses can be avoided.

Having described the preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. An optical apparatus comprising:
   first optical means for controlling a visual image to a first eye of a viewer consisting of
   (a) lens means having an optical axis;
   (b) display means for displaying a video image through said lens means on said optical axis;
   (c) beam splitter means for splitting a beam representing a visual image, said beam splitter means being arranged at an angle of substantially 45 degrees on said optical axis and located after said lens means;
   (d) shutter means disposed in front of said beam splitter means for selectively controlling transmission of an image therethrough from the optical apparatus surrounding to said first eye of the viewer, wherein said video image displayed on said display means appears as a virtual image superimposed upon said image from the surroundings when said first eye of the viewer views said video image from behind said beam splitter means;
   second optical means for controlling a visual image to a second eye of the viewer consisting of sub-shutter means for selectively controlling transmission of an image therethrough from the optical apparatus surroundings to said second eye of the viewer; and
   shutter control means for controlling image transmission operations of said shutter means and said sub-shutter means.

2. An optical apparatus according to claim 1, wherein said lens means is formed of a convex lens.

3. An optical apparatus according to claim 1, wherein said first optical means further comprises a casing having said lens means, display means, beam splitter means and shutter means housed therein.

4. An optical apparatus according to claim 3, wherein said casing includes first support means for arrangement thereof in front of said first eye of the viewer, and said second optical means includes second support means for arranging said sub-shutter means in front of such second eye of the viewer.

5. An optical apparatus according to claim 1, wherein a light transmission factor in a respective off state of said shutter means arranged in front of said first eye of the viewer is different from a light transmission factor in a respective off state of said sub-shutter means arranged in front of said second eye of the viewer.

6. An optical apparatus according to claim 1, wherein said shutter means and said sub-shutter means are respectively composed of liquid crystal display devices.

7. An optical apparatus according to claim 3, wherein said casing further comprises:
   a first sub-casing having at least said display means arranged therein; and
   a second sub-casing having said lens means arranged therein, said first sub-casing and said second sub-casing adapted to be relatively movable for increasing or decreasing a linear distance between said display means and said lens means.

8. An optical apparatus according to claim 4, wherein said sub-shutter means and said casing are attached to respective eyepieces of a pair of spectacles.

9. An optical apparatus according to claim 1, wherein said video image is generated by a video recording system.

10. An optical apparatus according to claim 1, wherein a signal of said video image is a composite video signal.

11. An optical apparatus according to claim 1, further comprising display control means for controlling said display means so as to display said video image.

12. An optical apparatus according to claim 1, wherein said shutter means include variable light transmission factors and further comprising shutter control means for controlling said shutter means so as to control the variable transmission factors of said shutter means.

13. An optical apparatus according to any one of the preceding claims, wherein said optical apparatus is used as a heads-up display for operating a vehicle.

14. An optical apparatus according to claim 1, wherein sad sub-shutter means comprises: a first liquid crystal display that in an on state has a light transmission factor of 0%; and a second liquid crystal display arranged around a periphery of said first liquid crystal display and that in the on state has a light transmission factor of 25%.

15. An optical apparatus according to claim 14, wherein said sub-shutter means further comprises a neutral density optical filter arranged around a periphery of said second liquid crystal display and having a light transmission factor greater that said light transmission factor of said second liquid crystal display in the on state.

16. An optical apparatus according to claim 15, wherein said sub-shutter means further comprises a second neutral density optical filter arranged around the periphery of the first neutral density filter that is arranged around said second liquid crystal display, said second neutral density filter having a light transmission greater than the light transmission factor of the first neutral density filter.

* * * * *

UNITED STATES PATENT AND TRADEMARK OFFICE
CERTIFICATE OF CORRECTION

PATENT NO. : 5,153,569
DATED : October 6, 1992
INVENTOR(S) : Akira Kawamura and Kazuo Togawa It is certified that error appears in the above-indentified patent and that said Letters Patent is hereby corrected as shown below:

```
Col. 2, lines 46 & 47, change "up-heads" to --heads-up--
Col. 4, line 49, change "50" to --50%--
Col. 7, line 30, change "an" to --the--
        line 32, change "the" to --an--

Col. 7, line 59, change "surrounding" to --surroundings--
Col. 8, line 58, change "sad" to --said--
```

Signed and Sealed this

Twenty-eighth Day of June, 1994

Attest:

BRUCE LEHMAN

Attesting Officer     Commissioner of Patents and Trademarks